June 28, 1960 T. UTERMOEHLEN 2,942,817
STABILIZATION GUIDE PARACHUTE
Filed Feb. 2, 1959

INVENTOR.
THEODORE UTERMOEHLEN
BY
ATTORNEYS

United States Patent Office 2,942,817
Patented June 28, 1960

2,942,817
STABILIZATION GUIDE PARACHUTE

Theodore Utermoehlen, 5 Sousa Place, Dayton 10, Ohio

Filed Feb. 2, 1959, Ser. No. 790,779

5 Claims. (Cl. 244—145)

(Granted under Title 35, U.S. Code (1952), sec. 266)

The invention described herein may be manufactured and used by or for the United States Government for governmental purposes without payment to me of any royalty thereon.

This invention relates to an improved guide surface stabilization parachute wherein each complete panel is made of one piece of fabric.

The present invention is an improvement over a similar parachute now in use which is made of two-piece panel construction consisting of a roof panel or gore and a guide surface panel sewn together to achieve the desired shape as disclosed in Patent No. 2,462,864 to H. G. Heinrich.

An object of the present invention is to provide a parachute which will give increased canopy performance as a result of elimination of the roof guide panel seam. Such construction will provide a more flexible and elastic parachute due to the elimination of that seam which will allow the canopy to assume a more effective shape.

An additional advantage of the present invention is the increased strength, durability and stability which has been provided with respect to performance through the elimination of the bulky joining of main seams and roof guide panel seams which is of major importance.

A further object or advantage of this invention is the substantial savings in manufacturing time and cost inherent in the manufacturing of the type of parachute canopy disclosed herein. A 35% savings can be made in manufacturing parachute canopies of this type by utilizing applicant's invention.

These and other objects and features of the present invention will appear from the following description thereof in which reference is made to the figures of the accompanying drawings.

Figure 2:
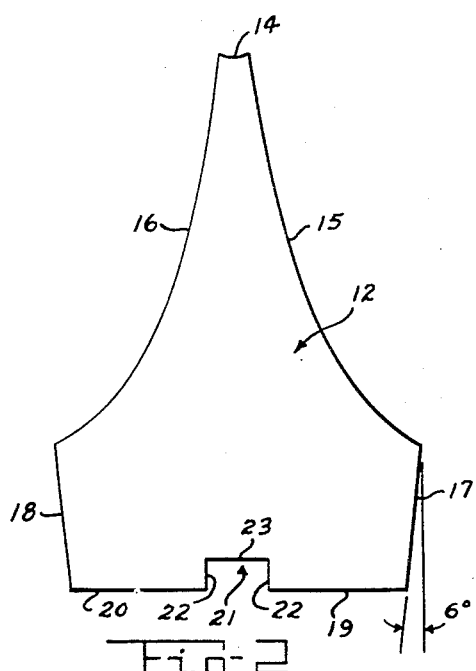
Fig. 2 is a plan view of one of the composite panels prior to forming.

Referring now to the drawing, wherein like parts carry like reference numerals, the parachute canopy generally designated 10 is formed by a plurality of identical panels 12 (Fig. 2).

Each panel 12 is formed by an arched peak edge 14 having two divergent curved edges 15 and 16 extending therefrom which respectively terminate at their location of greatest divergence, in juncture with two slightly converging straight edges 17 and 18.

The slightly converging straight edges 17 and 18 converge at an angle of approximately 12 degrees and terminate respectively, at their point of nearest convergence, in juncture with two collinear straight edges 19 and 20 of equal length. Said collinear straight edges 19 and 20 lie in a plane perpendicular to the plane of the unassembled panel 12 and are joined at their nearest extremities by the sides of a rectangular cutout portion 21 formed by two parallel edges 22 which are perpendicular to the edges 19 and 20 and an edge 23 which is parallel to said edges 19 and 20. The edge 23 is approximately twice the length of one of the edges 22.

In plan form (Fig. 2) a single panel 12 gives the appearance, when theoretically divided by a line through the juncture of edges 15 and 17, and the juncture of edges 16 and 18, of a base portion in the form of a trapezoid and a trumpet shaped upper section both symmetrical about the vertical centerline of the panel.

To form a panel the edge 19 is secured to the edge 20 by means of a seam 24 causing the edges 17 and 18 to form a portion of the base 26 of the canopy. Joining of the edges 19 and 20 places the two edges 22 end to end and juxtaposed with the edge 23. The two edges 22, now one continuous edge, are then secured to the edge 23 by means of a second seam 28. Having thus been formed the end of the panel assumes a somewhat conical shape.

The parachute canopy is then formed by securing together a plurality of the identical panels described above to form a complete circular guide surface parachute.

Figure 1:
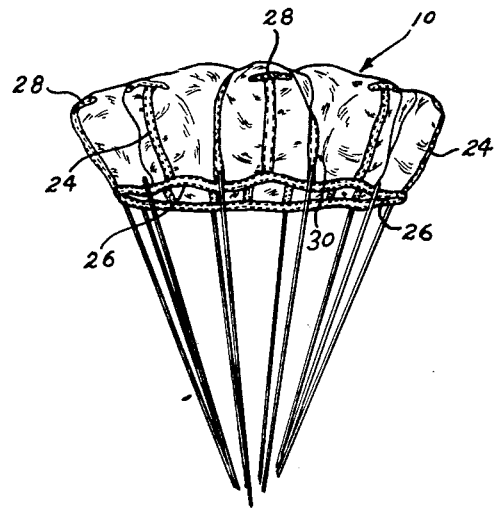
Fig. 1 is substantially a side view of the preferred embodiment of the present invention.
Figure 3:
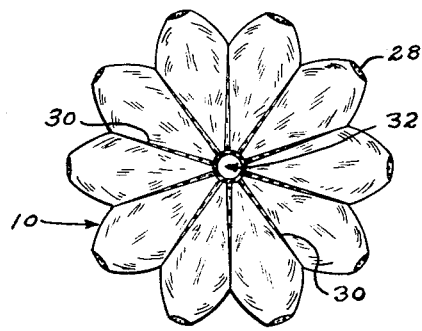
Fig. 3 is a top view of the assembled parachute canopy.

The panels are joined by securing the edge 15 of one panel to the edge 16 of a similar panel by means of a seam 30 to form a plurality of radially extending gores which when inflated give the appearance of the upper surface of intersecting cones. When sufficient panels are secured together to form the parachute canopy it will appear substantially as shown in Figs. 1 and 3 with the arched peak edges 14 of each panel forming a small circle 32 which may provide a central vent opening. When in operation the base of the canopy 26 will give the appearance of a scalloped circle with the portion below the top or crown inclined inwardly and downwardly to provide the annular guide surface.

Figure 4:
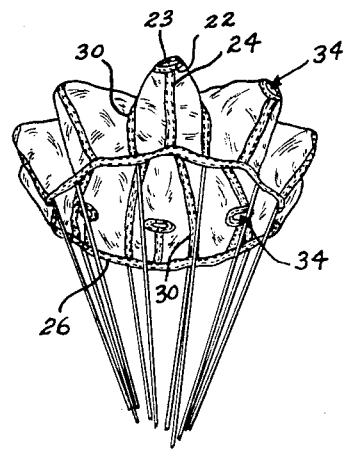
Fig. 4 is a modified form of the present invention wherein vent openings have been provided in each panel.

If a parachute canopy having air vents above the guide surface is desired the present invention can so provide by the elimination of the seam 28. When the seam 28 is eliminated the juxtaposed edges 22 and 23 are arranged to provide for an air vent 34 as shown in Fig. 4 of the drawings.

The present invention has been described in detail above for the purpose of illustration only and is not intended to be limited by this description or otherwise except as defined in the appended claims.

I claim:

1. In a guide surface parachute of the type described, a plurality of identical single-piece panels, each of said panels having an arched peak edge with two divergent curved edges extending therefrom which respectively terminate at their location of greatest divergence in juncture with two slightly converging straight edges, said slightly converging straight edges terminating at their point of nearest convergence in juncture with two collinear straight edges, said collinear straight edges being separated by a rectangular cutout portion, said panel being formed by means of a seam joining said two collinear straight edges.

2. A guide surface parachute canopy of the type described, comprising a plurality of identical single-piece panels, each of said panels having an arched peak edge with two divergent curved edges extending therefrom which respectively terminate at their location of greatest divergence in juncture with two slightly converging straight edges, said slightly converging straight edges terminating at their point of nearest convergence in juncture with two collinear straight edges, said collinear straight edges being separated by a rectangular cutout portion, said panel being formed by means of a seam joining said two collinear straight edges, and means for joining said panels to form said canopy.

3. A parachute canopy of the guide surface type comprising a plurality of gores, each of said gores being formed by a single panel, each of said panels having a base portion in the form of a trapezoid symmetrical about the vertical centerline of the panel, said panel having an upper section integral with said base portion which is trumpet shaped in planform and symmetrical about the panel centerline, a pair of separated collinear straight edges forming the lower edge of the base portion of each panel, said panel being folded and the collinear straight edges joined to form a guide surface at one end of the gore.

4. In a guide surface parachute of the type described, a plurality of identical single-piece panels, each of said panels having a peak edge and a trapezoid shaped base portion, a pair of curved edges joining said peak edge with said trapezoid shaped base portion, a pair of separated collinear straight edges forming one side of said trapezoid, and a seam joining said collinear straight edges to form said panel.

5. A guide surface parachute canopy of the type described comprising a plurality of identical single-piece panels, each of said panels having a peak edge and a trapezoid shaped base portion, a pair of curved edges joining said trapezoid shaped base portion with said peak edge, a pair of collinear straight edges forming the edge of said trapezoid shaped base portion most remote from said peak edge, a seam joining said collinear straight edges to form a panel, and additional means for joining said panels to form said canopy.

References Cited in the file of this patent
UNITED STATES PATENTS 2,462,864   Heinrich _____ Mar. 1, 1949